(12) United States Patent
Wilson (10) Patent No.: US 11,499,425 B2
(45) Date of Patent: Nov. 15, 2022

(54) BOREHOLE GRAVITY ANALYSIS FOR RESERVOIR MANAGEMENT

(71) Applicant: Halliburton Energy Services, Inc., Houston, TX (US)

(72) Inventor: Glenn Andrew Wilson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/492,694

(22) PCT Filed: Dec. 12, 2018

(86) PCT No.: PCT/US2018/065159
§ 371 (c)(1),
(2) Date: Sep. 10, 2019

(87) PCT Pub. No.: WO2020/122892
PCT Pub. Date: Jun. 18, 2020

(65) Prior Publication Data
US 2021/0355823 A1  Nov. 18, 2021

(51) Int. Cl.
*E21B 49/08*     (2006.01)
*E21B 41/00*     (2006.01)
*E21B 43/25*     (2006.01)
*G01V 7/06*      (2006.01)

(52) U.S. Cl.
CPC ...... *E21B 49/0875* (2020.05); *E21B 41/0035* (2013.01); *E21B 43/25* (2013.01); *G01V 7/06* (2013.01); *E21B 2200/20* (2020.05)

(58) Field of Classification Search
CPC .. E21B 49/0875; E21B 41/0035; E21B 43/25; G01V 7/06
USPC .......................................................... 703/10
See application file for complete search history.

(56) References Cited

U.S. PATENT DOCUMENTS

| | | | | |
|---|---|---|---|---|
| 6,612,171 | B1 * | 9/2003 | Stephenson | G01V 7/16 73/382 R |
| 7,069,780 | B2 * | 7/2006 | Ander | G01V 7/00 73/382 R |
| 7,109,717 | B2 * | 9/2006 | Constable | G01V 3/12 324/337 |
| 8,095,345 | B2 * | 1/2012 | Hoversten | G01V 11/00 703/2 |

(Continued)

FOREIGN PATENT DOCUMENTS

WO   WO-2020122892 A1 *  6/2020  ......... E21B 41/0035

OTHER PUBLICATIONS

Claudino et al. (Time-Lapse Seismic Modeling Assisted by Numerical Reservoir Simulation of Water and Gas Flooding Scenarios in Oil Reservoirs, Brzaillian Journal of Geophysics 2008, pp. 1-15) (Year: 2008).*

(Continued)

*Primary Examiner* — Iftekhar A Khan
(74) *Attorney, Agent, or Firm* — John Wustenberg; C. Tumey Law Group PLLC (57) ABSTRACT

Methods and systems of the present disclosure integrate time-lapse gravimetric data with dynamic reservoir modeling, whereby petrophysical constraints are applied to the inversion of the gravimetric data to constrain the resulting dynamic reservoir simulations.

8 Claims, 5 Drawing Sheets

(56) References Cited

U.S. PATENT DOCUMENTS

| | | | | |
|---|---|---|---|---|
| 8,437,961 | B2* | 5/2013 | Srnka | G01V 3/12 |
| | | | | 702/182 |
| 9,390,207 | B2* | 7/2016 | Killough | G01V 99/005 |
| 2008/0288226 | A1* | 11/2008 | Gurpinar | E21B 43/00 |
| | | | | 703/10 |
| 2009/0043554 | A1* | 2/2009 | Horne | G01V 3/083 |
| | | | | 703/10 |
| 2009/0223291 | A1* | 9/2009 | Donadille | E21B 43/16 |
| | | | | 73/382 R |
| 2010/0132448 | A1* | 6/2010 | Donadille | G01V 3/28 |
| | | | | 73/152.08 |
| 2010/0254217 | A1* | 10/2010 | Chu | G01V 1/308 |
| | | | | 367/38 |
| 2011/0042073 | A1* | 2/2011 | Legendre | E21B 49/00 |
| | | | | 166/250.01 |
| 2012/0271549 | A1* | 10/2012 | Edwards | G01V 7/00 |
| | | | | 702/6 |
| 2013/0297215 | A1* | 11/2013 | Rondeleux | G01V 11/00 |
| | | | | 702/7 |
| 2014/0257706 | A1* | 9/2014 | Biterge | G01V 1/40 |
| | | | | 702/13 |
| 2015/0204996 | A1* | 7/2015 | Dashevsky | G01V 7/04 |
| | | | | 324/324 |
| 2016/0178785 | A1* | 6/2016 | Wilson | E21B 49/08 |
| | | | | 324/324 |
| 2016/0266269 | A1* | 9/2016 | Wilson | G01V 3/30 |
| 2017/0328202 | A1* | 11/2017 | Hsu | E21B 49/10 |
| 2018/0058211 | A1* | 3/2018 | Liang | G01V 1/282 |
| 2018/0172860 | A1* | 6/2018 | Wilson | G01V 1/50 |
| 2018/0298752 | A1* | 10/2018 | Balan | E21B 43/20 |
| 2018/0329112 | A1* | 11/2018 | Lee | G01V 99/00 |
| 2019/0196039 | A1* | 6/2019 | Wilson | G01V 3/30 |
| 2020/0292722 | A1* | 9/2020 | Maucec | G01V 1/302 |
| 2021/0247534 | A1* | 8/2021 | Bø | G01V 1/302 |

OTHER PUBLICATIONS

Martin Landrø (Discrimination between pressure and fluid saturation changes from time-lapse seismic data, Geophysics, vol. 66, No. 3 (May-Jun. 2001); p. 836-844) (Year: 2001).*

Alixant, et al., 1995, In-situ residual oil saturation to gas from time-lapse borehole gravity: SPE 30609.

Brady, et al., 1996, Gravity methods: Useful techniques for borehole surveillance: SPE 26095.

Brady, et al., 1998, Improved production log interpretation in horizontal wells using a combination of pulsed neutron logs, quantitative temperature log analysis, time lapse LWD resistivity logs, and borehole gravity: SPE 46222.

Dodds, et al., 2013, Evaluating time-lapse borehole gravity for CO2 plume detection at SECARB Cranfield: International Journal of Greenhouse Gas Control, 18, 421-429.

Ferguson, et al., 2007, The The 4D microgravity method for waterflood surveillance: Gravity measurements for the Prudhoe Bay reservoir, Alaska: Geophysics, 72, I33-I43.

Ferguson, et al., 2008, The 4D microgravity method for waterflood surveillance: Part 3—4D absolute microgravity surveys at Prudhoe Bay, Alaska: Geophysics, 73, WA163-WA171.

Gasperikova, et al., 2008. Gravity monitoring of CO2 movement during sequestration: Model studies high-resolution density from borehole gravity data: Geophysics, 73. WA105-WA112.

Hadj-Sassi, et al., Donadille, 2010, Three-dimensional inversion of borehole gravity measurements for reservoir fluid monitoring: SPE 136928.

Hammer, 1950, Density determination by underground gravity measurements: Geophysics, 15, 637-652.

Hare, et al., 1999, The 4-D microgravity method for waterflood surveillance: A model study for the Prudhoe Bay reservoir, Alaska: Geophysics, 64, 78-87.

International Search Report and The Written Opinion of the International Search Authority, or the Declaration, dated Aug. 13, 2019, PCT/US2018/065159, 11 pages, ISA/KR.

Krahenbuhl et al., 2012, Time-lapse gravity: A numerical demonstration using robust inversion and joint interpretation of 4D surface and borehole data: Geophysics, 77, G33-G43.

Krahenbuhl, et al., 2012, The benefit of borehole gravity in horizontal monitoring wells for time-lapse applications: Presented at SEG Annual Meeting.

Krahenbuhl, et al., 2014, Improved recovery of fluid movement through time-lapse borehole vector gravity: Presented at SEG Annual Meeting.

Krahenbuhl, et al., 2015, Time-lapse monitoring of CO2 sequestration: A site investigation through integration of reservoir properties, seismic imaging, and borehole and surface gravity data: Geophysics, 80, WA15-WA24.

LaFehr, 1983, Rock density from borehole gravity surveys: Geophysics, 48, 341-356.

Li, et al., 1999, On density derived from borehole gravity: The Log Analyst, 40, 33-37.

Loermans, et al. 2006, Intelligent monitoring? . . . Add borehole gravity measurements! SPE 99554.

McCulloh, 1965, A confirmation of gravity measurements of an underground density profile based on core densities: Geophysics, 30, 1108-1132.

Mosher, et al., 2013, Minimum structure borehole gravity inversion for mineral exploration: A synthetic modeling study: Geophysics, 78, G25-G39.

Nind, et al., 2007, Development of a borehole gravimeter for mining applications: First Break, 25, 71-77.

Popta, et al., 1990, Use of borehole gravimetry for reservoir characterization and fluid saturation monitoring: SPE 20896.

Reitz, et al., 2014, Feasibility of surface and borehole time-lapse gravity data for SAGD monitoring: Presented at SEG Annual Meeting.

Rim, et al., 2015, Advantages of borehole vector gravity in density imaging: Geophysics, 80, G1-G13.

Schultz, 1989, Monitoring fluid movement with a borehole gravity meter: Geophysics, 54, 1267-1273.

Sherlock, et al., 2006, Gravity monitoring of CO2 storage in a depleted gas field: A sensitivity study: Exploration Geophysics, 37, 37-43.

Siegel, et al., 2007, Development of a borehole gravity meter for mining applications: In B. Milkereit (Ed.), Proceedings of Exploration '07, Fifth Decennial International Conference on Mineral Exploration, 1143-1147.

Smith, 1950, The case for gravity data from boreholes: Geophysics, 15, 605-636.

Stenvold, et al., 2008, Gravimetric monitoring of gas-reservoir water influx—a combined flow- and gravity-modeling approach: Geophysics, 73, WA123-WA131.

Thomsen, et al., 2003, A novel approach to 4D: Full field density monitoring: Presented at SEG Annual Meeting, 4D Time Lapse Rock Properties Workshop.

* cited by examiner

BOREHOLE GRAVITY ANALYSIS FOR RESERVOIR MANAGEMENT

PRIORITY

The present application is a U.S. National Stage patent application of International Patent Application No. PCT/US2018/065159, filed on Dec. 12, 2018, the benefit of which is claimed and the disclosure of which is incorporated herein by reference in its entirety.

FIELD OF THE DISCLOSURE

The present disclosure relates generally to hydrocarbon reservoir management and, more specifically, to the integration of gravimetric data into reservoir management workflows and practices.

BACKGROUND

Reservoir simulators apply multiphase flow simulations to a coupled infrastructure-reservoir model, with attributes of (but not limited to) temperature, pressure, porosity, permeability, and saturation attributes populating a geocellular model. History matching workflows, such as Landmark Graphics Corp.'s Decision Management System (DMS™) is a process whereby the outputs of reservoir simulators are matched to actual volumetrics and/or time-lapse seismic data to update dynamic attributes of the reservoir model, such as saturation due to fluid substitution. This history matching process reduces uncertainty in the reservoir model, which in turn, provides higher confidence in simulated production or depletion forecasts and/or field development plans, planning and executing enhanced recovery operations such as waterflooding, and the monitoring, verifying, and accounting for carbon sequestration. That said, significant uncertainty in the saturation attributes can remain, due to the various standard reservoir diagnostic techniques having limited sensitivity to fluid substitution in the inter-wellbore zones of the reservoir model.

One independent method of characterizing a reservoir is by using gravimetric measurements to estimate the spatial density distribution. Time-lapse gravimetric measurements can be used to estimate the spatial changes in density distribution, which can infer fluid substitution. Such independent quantification of the spatial and temporal changes in fluids within a reservoir is useful for reducing the aforementioned uncertainties in reservoir models. Airborne and surface gravimetric data is widely used for exploration, such as depth-to-basement, and salt geometries. Surface gravimetric data has had limited application for time-lapse reservoir management. While sensitive to bulk changes in mass at the reservoir scale, surface gravimetric data has limited sensitivity to reservoir model-scale changes in fluid substitution, which is of primary interest to reservoir management.

DESCRIPTION OF ILLUSTRATIVE EMBODIMENTS

Illustrative embodiments and related methods of the present disclosure are described below as they might be employed in systems and methods for gravimetric analysis in reservoir management. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of this disclosure will become apparent from consideration of the following description and drawings.

As described herein, illustrative methods and systems of the present disclosure integrate gravimetric data with dynamic reservoir simulations, whereby petrophysical constraints are applied to the inversion of the gravimetric data, thereby further constraining the history matching of dynamic reservoir simulations with an additional, independent dataset sensitive to fluid substitution within the reservoir.

In a generalized method, gravimetric data of a reservoir is obtained using any suitable surface or downhole sensor system capable of measuring at least one component of the gravitational vector and/or gravitational gradients. The sensor systems may be deployed in the formation on either a temporal (e.g., via a wireline logging tool, logging-while-drilling ("LWD") tool, slickline, coiled tubing, etc.) or a permanent (e.g., via intelligent completions) deployment. The a priori (existing) saturation model constrains the inversion of the gravimetric data because the existing model provides a base saturation levels. Here, the a priori saturation model represents a first saturation value taken at a first time T1, while the time-lapse saturation model represents a second saturation value taken at a second time T2, thus providing a delta saturation value. The methods of constraining the inversion further include applying reservoir-specific rules to the inversion used to generate a time-lapse saturation model. The updated saturation model is then generated from the sum of the a priori and time-lapse saturation models. Dynamic reservoir simulations can then be performed using the updated saturation model. Thereafter, decisions such as production forecasting, field planning, drilling, or otherwise performing a wellbore operation (e.g., with intelligent completions) can be made, informed by results from the dynamic reservoir simulation. Accordingly, the gravimetric data are integrated into the overall reservoir management workflows and processes.

In the illustrative methods and systems described herein, a variety of techniques may be used to obtain gravimetric data. Both surface and downhole sensor systems may be used.

To begin, the fundamental concepts of the present disclosure will now be described. The gravity field g satisfies:

$$\nabla \cdot g(r) = -4\pi G \rho(r), \quad \text{Eq. (1)}$$

$$\nabla \times g(r) = 0, \quad \text{Eq. (2)}$$

where G is the universal gravitational constant, and $\rho(r)$ is the 3D density distribution within a domain D. The gravity field can also be expressed by the gravity potential U:

$$g(r) = \nabla U(r), \quad \text{Eq. (3)}$$

where the gravity potential has the solution:

$$U = G \iiint_D \frac{1}{|r-r'|} \rho(r) d^3 r. \quad \text{Eq. (4)}$$

As the first spatial derivatives of the gravity potential, the vector gravity field (also referred to as the gravitational vector) can be expressed as:

$$g(r) = G \iiint_D \frac{K_\alpha(r-r')}{|r-r'|} \rho(r) d^3 r, \quad \text{Eq. (5)}$$

where the kernel $K_\alpha$ is equal to:

$$K_\alpha(r-r') = \alpha - \alpha', \ \alpha = x,y,z. \quad \text{Eq. (6)}$$

Spatial gradients of the vector gravity field (also referred to as gravitational gradients) are obtained as the second spatial derivatives of the gravity potential.

The gravity response in Equation (5) is directly proportional to density. The premise of a borehole gravimeter is that the "apparent" (or "bulk" or "in situ") density $\rho_\alpha$ of near-horizontal formations is proportional to gradient between two vertically-offset vertical gravity component $g_z$ measurements:

$$\rho_a = \frac{1}{4\pi G} \frac{\Delta g_Z}{\Delta z}. \quad \text{Eq. (7)}$$

In certain illustrative methods of the present disclosure, for time-lapse gravimetric measurements, Equation (5) is modified as:

$$\Delta g(r) = G \iiint_D \frac{K_\alpha(r-r')}{|r-r'|} \Delta \rho(r) d^3 r. \quad \text{Eq. (8)}$$

The time-lapse gravimetric response is proportional to the change in density. That is, the time-lapse gravity response is only due to changes in density. For active reservoirs, these changes can be assumed to be contained only within the reservoir; meaning that those formations forming the over- and underburden can be neglected from the domain D. The time-lapse gravimetric measurements are reservoir measurements obtained at two different times. Preferentially, but not necessarily, the time lapse gravimetric measurements are acquired from the same spatial locations.

For a given cell in the reservoir geocellular model, the density is calculated as:

$$\rho = (1-\varphi)\rho_r + \varphi(S_w \rho_w + S_g \rho_g + S_o \rho_o), \quad \text{Eq. (9)}$$

where $\varphi$ is the porosity; $S_{w/g/o}$ is the saturation; and r/w/g/o subscripts denote rock, water, gas, and oil, respectively, and:

$$S_w + S_g + S_o = 1. \quad \text{Eq. (10)}$$

Note that variants of Equation (9) exist may be used alternatively. Nevertheless, assuming there is no reservoir compaction due to depletion, or expansion due to injection, the change is density is:

$$\Delta \rho = \Delta S_w \rho_w + \Delta S_g \rho_g + \Delta S_o \rho_o, \quad \text{Eq. (11)}$$

where:

$$\Delta S_w + \Delta S_g + \Delta S_o = 0. \quad \text{Eq. (12)}$$

It is appreciated that the above equations can be modified to include dynamic changes in reservoir volumetrics derived from independent data, such as micro-deformation data.

As discussed below, the illustrative reservoir models described herein preserve a mass-load balance, such that the mass balance of the injected and produced fluids are preserved.

It is understood that due to reservoir thermodynamics, fluid saturation and density may be a function of pressure, temperature, and salinity. As such, a more general equation may be expressed as:

$$\Delta \rho = \Delta S_w \rho_w(P,T,s) + \Delta S_g \rho_g(P,T,s) + \Delta S_o \rho_o(P,T,s) \quad \text{Eq. (13)}$$

It follows that for the time-lapse gravimetric data used herein, an inversion of the forward problem may be constructed as follows:

$$\Delta g(r) = \quad \text{Eq. (14)}$$
$$G \iiint_D \frac{K_\alpha(r-r')}{|r-r'|} [\Delta S_w(r) \rho_w(P,T,s,r) + \Delta S_g(r) \rho_g(P,T,s,r) + \Delta S_o(r) \rho_o(P,T,s,r)] d^3 r,$$

In certain illustrative methods as described herein, Equation (14) is constrained by various petrophysical constraints embodies in the following reservoir-specific rules: (1) the inversion rule used to generate the saturation model assumes the change in combined water, gas, and oil saturations of the reservoir is equal to zero, which can be expressed as $\Delta S_w + \Delta S_g + \Delta S_o = 0$ (also referred to as fluid substitution); (2) the inversion rule used to generate the saturation model assumes an increase of the injected fluid saturation of the reservoir, e.g., which can be expressed as $\Delta S_w > 0$; (3) the inversion rule used to generate the saturation model assumes a decrease in the produced fluid saturation of the reservoir, e.g., which can be expressed as $\Delta S_o < 0$; (4) the inversion rule used to generate the saturation model assumes fluid flow in the reservoir is continuous, which can be expressed, for example, as $\nabla(\Delta S_w) \geq 0$; or (5) the inversion rule used to generate the saturation model assumes a produced-injected fluid mass load balance in the reservoir, which can be expressed as:

$$\iiint_D [\Delta S_w(r)\rho_w(P,T,s,r) + \Delta S_g(r)\rho_g(P,T,s,r) + \Delta S_o(r)\rho_o(P,T,s,r)] d^3 r = m$$

Such reservoir-specific rules ensure the most accurate saturation model is being generated at all times while honoring the measured gravimetric data.

In certain other illustrative methods of the present disclosure, the inversion may be further regularized by including weights constructed from reservoir permeability, porosity, and pressure measurements or with directional regularization derived from reservoir simulator-based flow streams. Directional regularization refers to the introduction of preferential directional and spatial weighting of the fluid saturations. This can force spatial correlations between model parameters, e.g., the change in saturations will preferentially occur in the directions of expected flow.

Figure 1A:
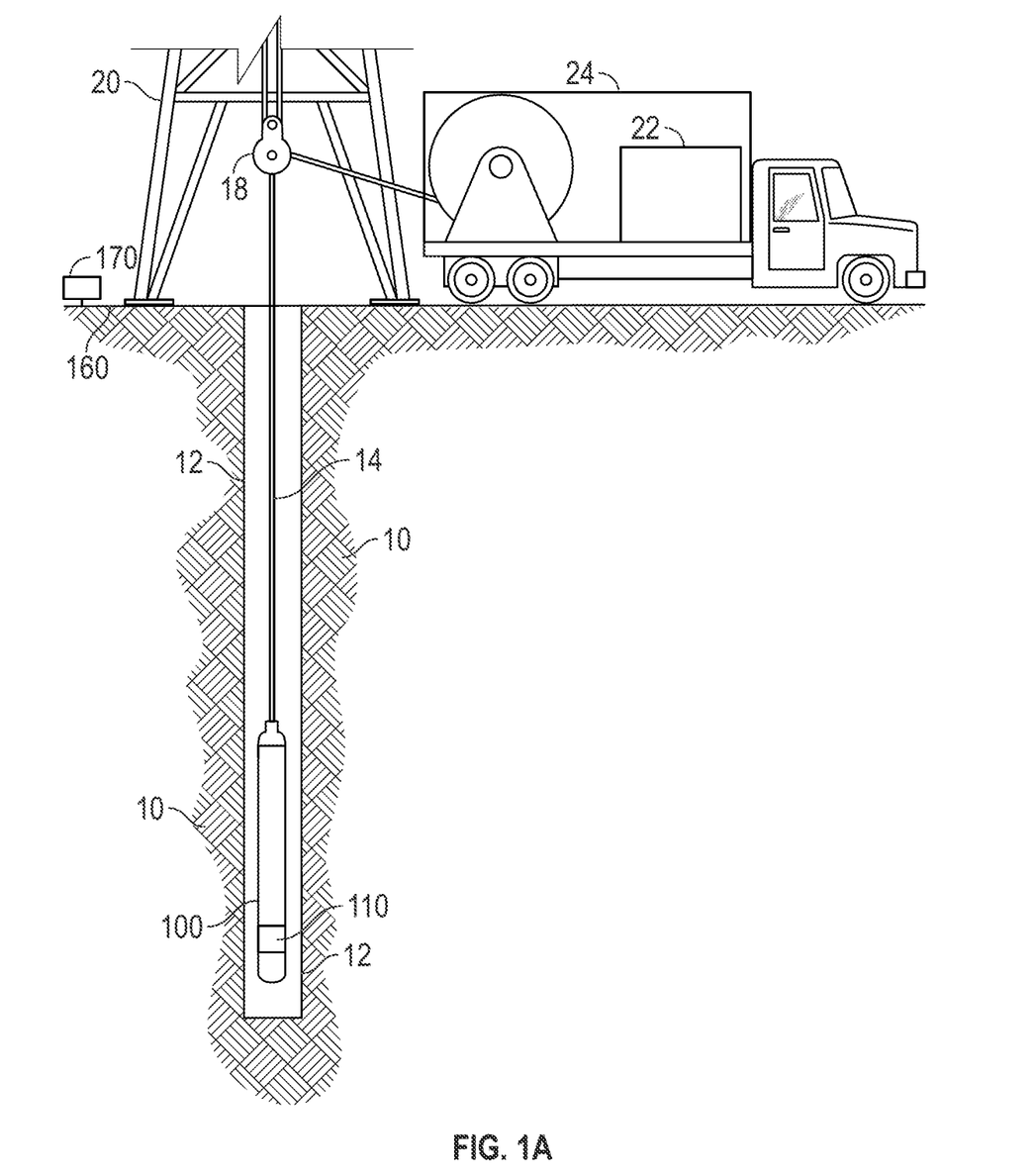
FIG. 1A illustrates a wellbore environment and wireline system in which illustrative methods of the present disclosure may be performed.

FIG. 1A illustrates a wellbore environment and wireline system in which illustrative methods of the present disclosure may be performed. In alternative applications, however, the present disclosure may also be practice in a drilling application, such as an LWD tool. Nevertheless, suspended within a borehole 12 at the bottom end of a carrier such as a wireline 14 is a device, such as a well tool 100. Wireline 14 may be carried over a pulley 18 supported by a derrick 20. Wireline deployment and retrieval may be performed by a powered winch carried by a service truck 22, for example. A control system 24 interconnected to the well tool 100 through the wireline 14 by conventional means controls transmission of electrical power and data/command signals, and also provides control over operation of the components in the well tool 100.

In certain illustrative embodiments of the present disclosure, well tool 100 may be configured to collect information regarding force or acceleration. An illustrative well tool 100 may include a gravimeter 110. Gravimeter 110 may be a single-component gravimeter or a multi-component gravimeter. Well tool 100 may be specially configured to take gravimetric measurements and/or to carry gravimeter 110. Depending on the operating principle of the well tool 100, well tool 100 may be configured to operate under surface and borehole conditions. In other illustrative embodiments, gravimeter 110 from well tool 100, may be used at surface 160. Borehole 12 may also intersect surface 160 at a point 170, which may be the well head.

An earth formation may be characterized in accordance with embodiments of the present disclosure by using at least one gravimeter operable to generate gravimetric data by measuring a component of the acceleration of gravity at a particular location (i.e., vector gravimetric data) or by measuring a spatial derivative of a component of the acceleration of gravity at a particular location (i.e., gradient gravimetric data). Gravimeter 110 may be deployed at the surface of the earth formation (e.g., at point 170 or elsewhere at the surface 160) or within the earth formation in or near a volume of interest, such as, for example, in borehole 12 extending along formation 10. In some implementations, a plurality of gravimeters 110 may be used in multiple locations. The volume of interest may be a hydrocarbon reservoir or an acquifer.

At the selected depth, gravimeter 110 may be positioned against the borehole wall 12, such as by a mechanism like a hydraulic cylinder, and attached to the earth formation or borehole casing by some method. A gravimetric measurement may be obtained by gravimeter 110 before the attachment mechanism is retracted into tool 100. In certain illustrative embodiments, tool 100 may include a device configured to detect and/or estimate fluid saturation (e.g., water, gas, or oil saturation) and/or fluid flow in the subterranean formation 10. For example, tool 100 may be operable to detect measurements used to estimate the location of water/oil interface during water flooding. Fluid saturation and other fluid movement parameters may be estimated by comparing gravitational acceleration measurements with other gravitational acceleration measurements over time (i.e., time-lapse gravimetric data).

Control system 24 is communicably coupled to gravimeter 110 to effect and control the illustrative methods described herein. The processing circuitry of control system 24 may take a variety of forms, and may be located downhole or at surface 160. For example, the processing circuitry may include at least one processor, a non-transitory, computer-readable memory, transceiver/network communication module, and optional I/O devices and user interface, all interconnected via a system bus. Software instructions executable by the processor for implementing the functions of the illustrative ultrasonic logging tools and transducers described herein may be stored in memory.

In certain embodiments, the processing circuitry may be connected to one or more public and/or private networks via one or more appropriate network connections. It will also be recognized that the software instructions to perform the functions of the present disclosure may also be loaded into memory from a CD-ROM or other appropriate storage media via wired or wireless methods.

Moreover, those ordinarily skilled in the art will appreciate that embodiments of this disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. This disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Figure 1B:
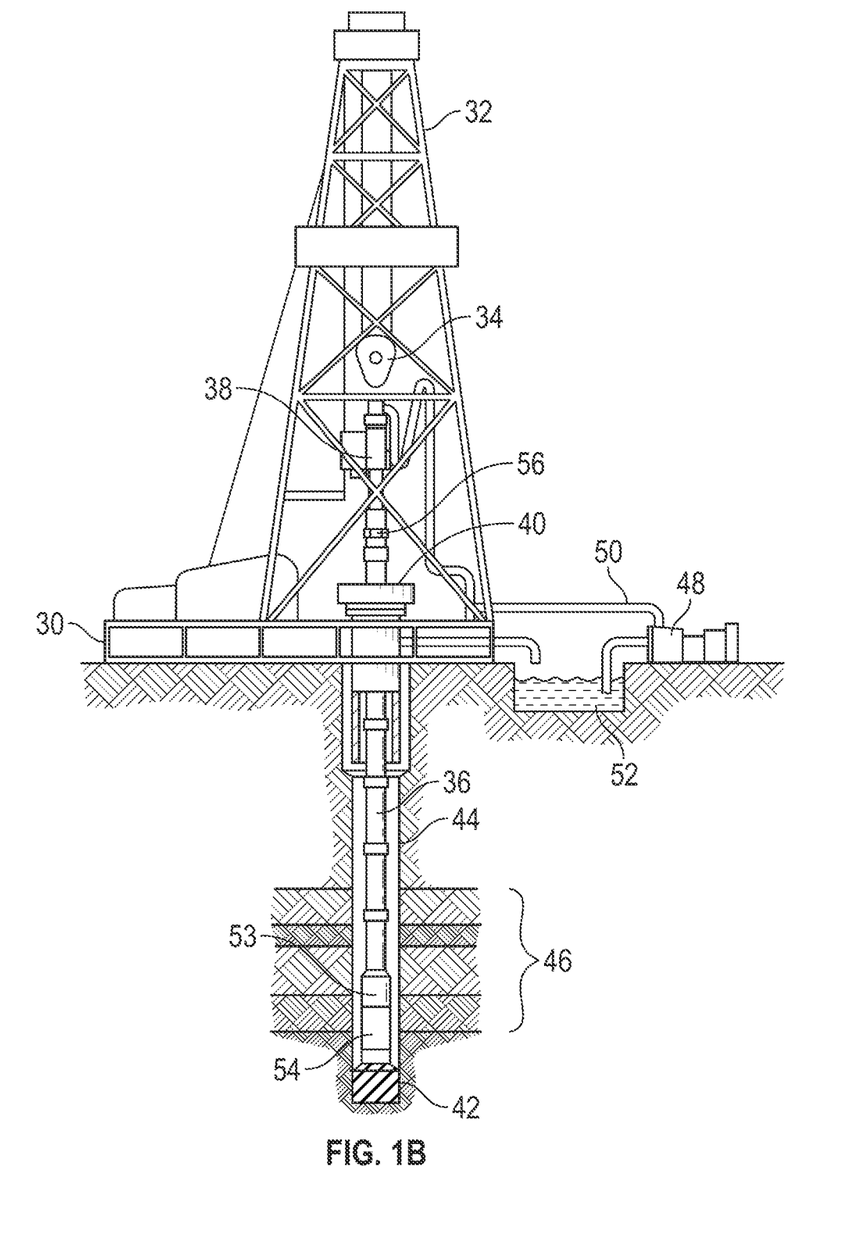
FIG. 1B illustrates another wellbore environment and LWD system in which illustrative methods of the present disclosure may be performed.

FIG. 1B illustrates another wellbore environment and LWD system in which illustrative methods of the present disclosure may be performed. Drilling platform 30 is equipped with a derrick 32 that supports a hoist 34 for raising and lowering a drill string 36. Hoist 34 suspends a top drive 38 suitable for rotating drill string 36 and lowering it through well head 40. Connected to the lower end of drill string 36 is a drill bit 42. As drill bit 42 rotates, it creates a wellbore 44 that passes through various layers of a formation 46. A pump 48 circulates drilling fluid through a supply pipe 50 to top drive 38, down through the interior of drill string 36, through orifices in drill bit 42, back to the surface via the annulus around drill string 36, and into a retention pit 52. The drilling fluid transports cuttings from the borehole into pit 52 and aids in maintaining the integrity of wellbore 44. Various materials can be used for drilling fluid, including, but not limited to, a salt-water based conductive mud.

A logging tool 53 is integrated into the bottom-hole assembly near bit 42. In this illustrative embodiment, logging tool 53 includes a tool 54 configured to collect information regarding force or acceleration and includes a gravimeter, as described herein. For example, at a selected depth, gravimeter 54 may be positioned against the borehole wall of wellbore 44, such as by a mechanism like a hydraulic cylinder, and attached to the earth formation or borehole casing by some method. A gravimetric measurement may be obtained by gravimeter 54 before the attachment mechanism is retracted into tool 53. In certain illustrative embodiments, tool 53 may include a device configured to detect and/or estimate fluid saturation (e.g., water, gas, or oil saturation) and/or fluid flow in the subterranean formation 46. For example, tool 53 may be operable to detect measurements used to estimate the location of water/oil interface during water flooding. Fluid saturation and other fluid movement parameters may be estimated by comparing gravitational acceleration measurements with other gravitational acceleration measurements over time (i.e., time-lapse gravimetric data).

Still referring to FIG. 1B, a telemetry sub (not shown) may be included to transfer measurement data/signals (e.g., gravimetric measurements) to a surface receiver 56 and to receive commands from the surface. In some embodiments, the telemetry sub does not communicate with the surface, but rather stores measurement data for later retrieval at the surface when the logging assembly is recovered.

In certain embodiments, logging tool 53 includes a system control center ("SCC"), along with necessary processing/storage/communication circuitry, that is communicably coupled to one or more transmitters/receivers (not shown) utilized to acquire the measurement signals described herein. In certain embodiments, once the measurements are acquired, the system control center performs the methods described herein, and then communicates the data back uphole and/or to other assembly components via the telemetry sub. In an alternate embodiment, the system control center may be located at a remote location away from logging tool 53, such as the surface or in a different borehole, and performs the processing accordingly. These and other variations within the present disclosure will be readily apparent to those ordinarily skilled in the art having the benefit of this disclosure.

Figure 1C:
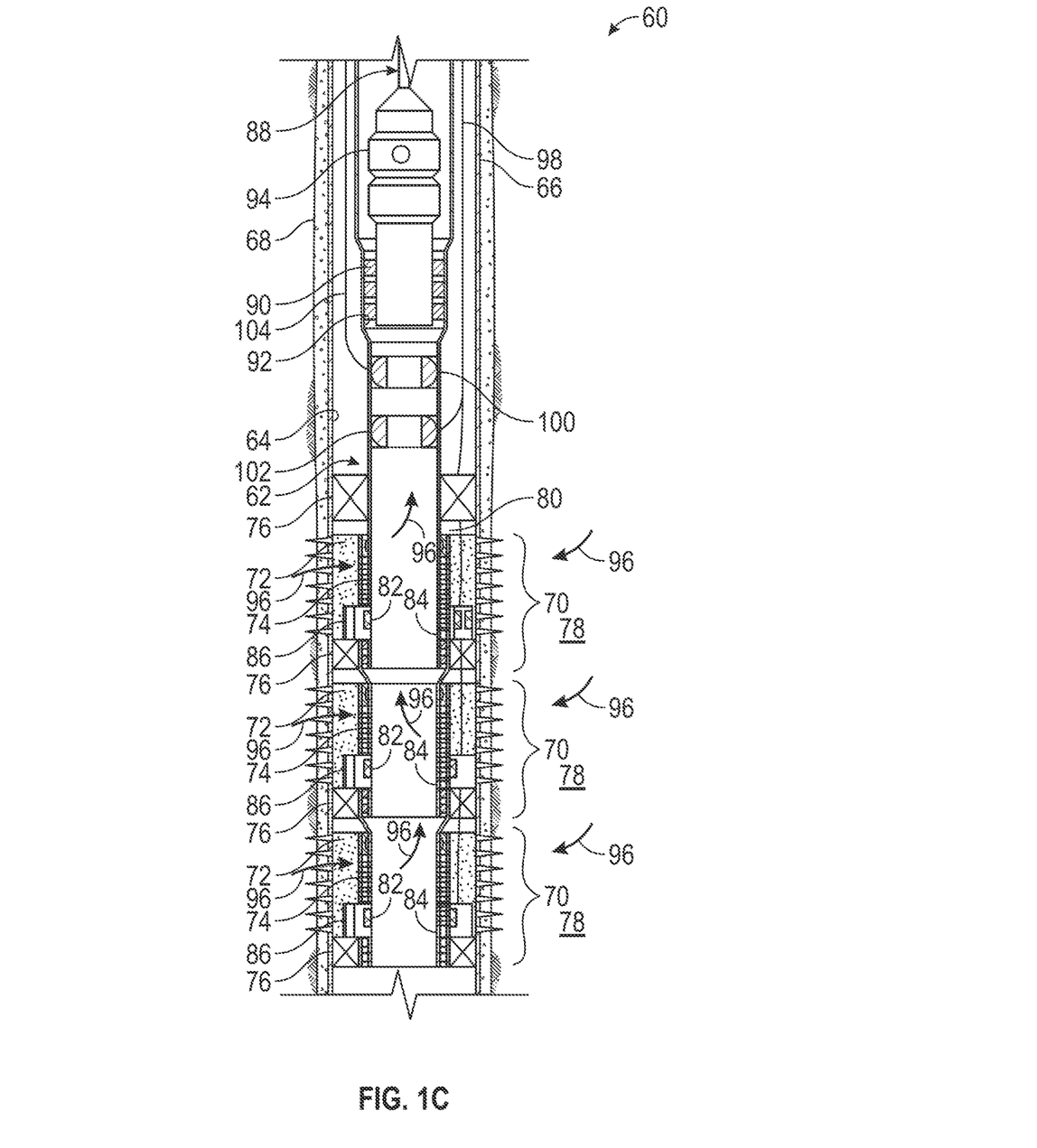
FIG. 1C illustrates another wellbore environment and intelligent completion system in which illustrative methods of the present disclosure may be performed.

FIG. 1C illustrates another wellbore environment and intelligent completion system in which illustrative methods of the present disclosure may be performed. An intelligent well completions system 60 includes a tubing string 62 installed in a wellbore 64 lined with casing 66 and cement 68. In other examples, tubing string 62 could be at least partially installed in an uncased or open hole portion of wellbore 64. Tubing string 62 can be suspended from a tubing hanger (not shown) at or near the earth's surface (for example, in a surface or subsea wellhead).

Tubing string 62 includes multiple sets 70 of completion equipment. In some examples, all of sets 70 of completion equipment can be conveyed into the well at the same time on tubing string 62. Gravel 72 can be placed about well screens 74 included in the completion equipment in a single trip into wellbore 64, using a through-tubing multiple zone gravel packing system. Packers 76 on tubing string 62 are used to isolate multiple earth formation zones 78 from each other in wellbore 64. The packers 76 seal off an annulus 80 formed radially between tubing string 62 and wellbore 64.

Also included in each set 70 of completion equipment is a flow control device 82 and a hydraulic control device 84 which controls hydraulic actuation of the flow control device. A suitable flow control device, which can variably restrict flow into or out of the tubing string 62, may be the infinitely variable interval control valve IV-ICV™ marketed by Halliburton Energy Services, Inc. A suitable hydraulic control device for controlling hydraulic actuation of the IV-ICV™ may be the surface controlled reservoir analysis and management system, or SCRAMS™, which is also marketed by Halliburton Energy Services.

In each completion equipment set 70, one or more sensors 86 are included for various functions such as sensing pressure internal and/or external to tubing string 62. Other types of sensors may be used in addition to, or instead of, a pressure sensor. For example, sensor(s) 86 could also, or alternatively, include a flow rate sensor, a water cut or fluid composition sensor, or any other type of sensors. In yet other examples, sensor(s) 86 may be a gravimeter as described herein used to obtain gravimetric data. Although not shown, at a selected depth, the gravimeters may be positioned against casing 66 or the open hole wall of wellbore 64, such as by a mechanism like a hydraulic cylinder extending radially out from sensors 86. A gravimetric measurement may then be obtained by the gravimeters before the attachment mechanism is retracted into the body of sensors 86. Alternatively, gravimeters may also be positioned along casing 66 (e.g., behind the string so they contact the formation so that gravimetric measurements may also be obtained.

Packers 76 are preferably set by applying internal pressure. Packers 76 are set after tubing string 62 has been landed (for example, in a wellhead at or near the earth's surface). Preferably, no disconnect subs or expansion joints are required for spacing out tubing string 62 relative to the wellhead prior to setting packers 62, although such disconnect subs or expansion joints may be used, if desired.

A gravel packing work string and service tool (not shown) used to direct flow of a fracturing and/or gravel packing slurry into the well is installed after packers 76 are set. After the gravel packing operation is completed, the gravel packing work string and service tool is retrieved. The well can then be produced via the tubing string 62. Alternatively, or in addition, a production string 88 (such as, a coiled tubing string, etc.) may be lowered into wellbore 64 and stabbed into tubing string 62, if desired. The production string 88 in this example includes seals 90 for sealingly engaging a seal bore 92 in an uppermost one of the packers 76.

Production string 88 can include an electric submersible pump 94. In other examples, pump 94 could be conveyed by cable or wireline, in which case the tubing string 62 could be used for flowing a fluid 96 to the earth's surface above the pump. However, use of pump 94 is not necessary, at least initially. Pump 94 may be installed in certain embodiments only after partial depletion of the well.

In the system 10 as depicted in FIG. 1C, lines 98 are carried externally on the tubing string 62. Preferably, lines 98 include one or more electrical, hydraulic and optical lines (e.g., at least one optical waveguide, such as, an optical fiber, optical ribbon, etc.). However, in other examples, all or part of lines 98 could be positioned internal to the tubing string 62, or in a wall of the tubing string. Preferably, lines 98 are external to tubing string 62 (for example, between the well screens 74 and the wellbore 64), so that properties of fluid 96 which flows between the zones 78 and the interior of tubing string 62 can be readily detected by lines 98. In other examples, lines 98 could be positioned in a wall of the casing 66, external to the casing, in the cement 68, etc.

Also included in tubing string 62 are a safety valve 100 and an isolation valve 102. Safety valve 100 is used to prevent unintended flow of fluid 96 out of the well (e.g., in the event of an emergency, blowout, etc.), and isolation valve 102 is used to prevent the zones 78 from being exposed to potentially damaging fluids and pressures thereabove at times during the completion process. The safety valve 100 may be operated using one or more control lines 104 (such as, electrical and/or hydraulic lines), or the safety valve may be operated using one or more of the lines 98. The isolation valve 102 may be operated using one or more of the lines 98.

Figure 2:
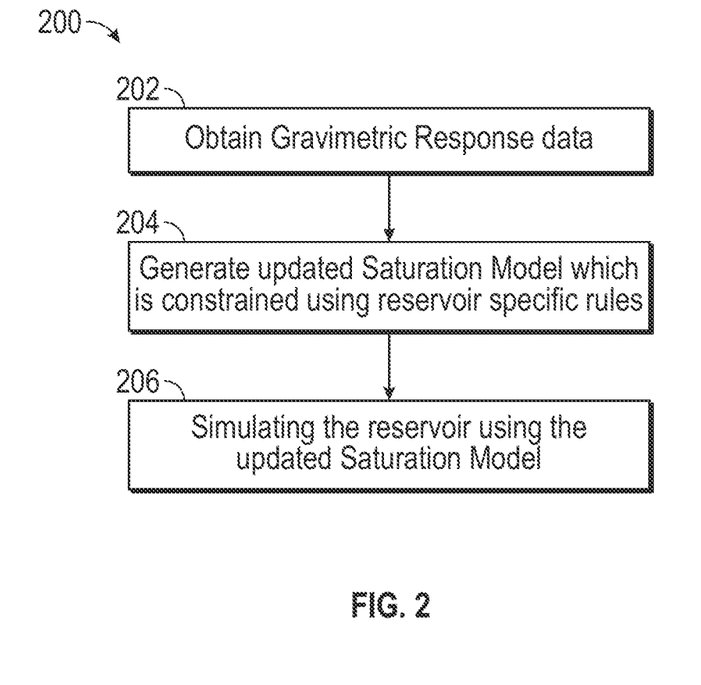
FIG. 2 is a flow chart of a method for reservoir management, according to certain illustrative methods of the present disclosure.

In light of the foregoing, FIG. 2 is a flow chart of a method for reservoir management, according to certain illustrative methods of the present disclosure. At block 202 of method 200, gravimetric data of a reservoir is obtained using a surface or downhole gravimeter device, such a gravimeter 110 (FIG. 1A). The gravity response data may be time-lapse data, temporal data, or continuous data. At block 204, an updated saturation model is generated, in which the a priori saturation model is updated by an inversion of the gravimetric data constrained using one or more of the reservoir-based rules described herein. At block 206, a reservoir is simulated using the updated saturation model. Thereafter, a wellbore may be planned, drilled, or completed using the reservoir model. Moreover, other wellbore operations may be conducted using the reservoir model such as, for example, production prediction or history matching, or controlling an intelligent completion such as an inflow control device (ICD) or inflow control valve (ICV).

Figure 3:
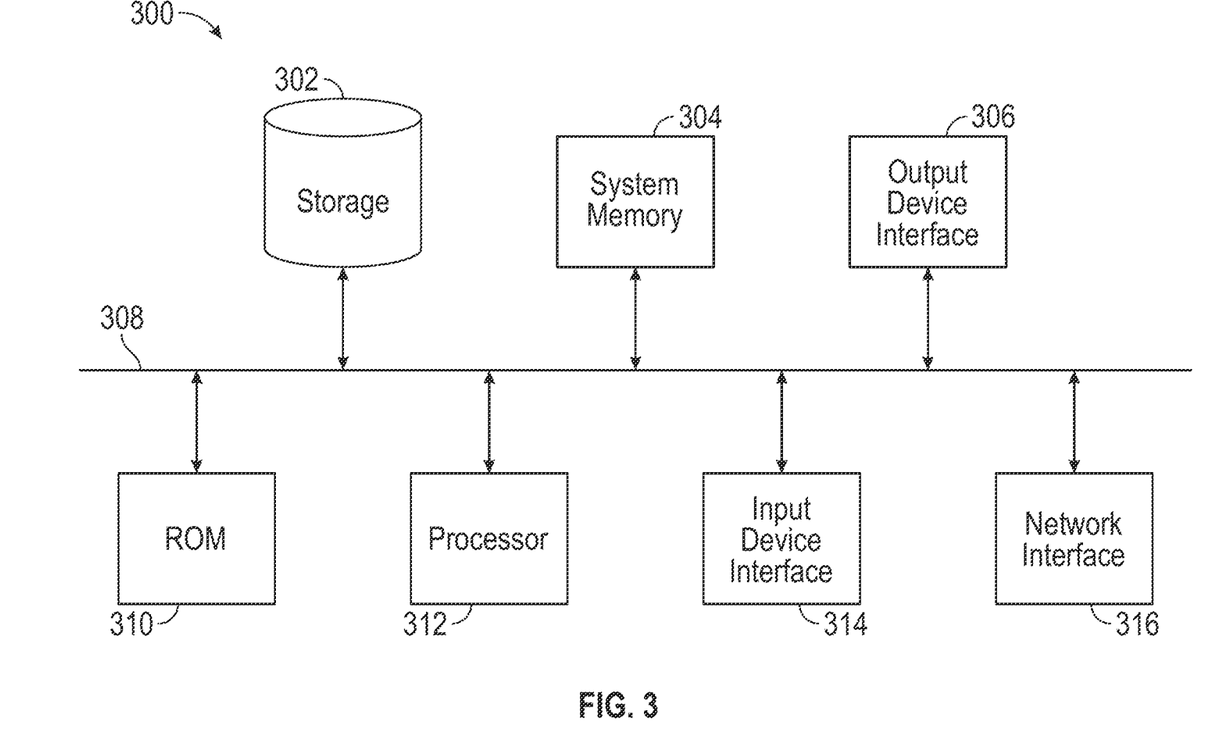
FIG. 3 is a block diagram of an illustrative computing system 300 in which embodiments of the present disclosure may be implemented for performing reservoir management.

FIG. 3 is a block diagram of an illustrative computing system 300 (also illustrated in FIG. 1A as control system 24) in which embodiments of the present disclosure may be implemented for performing reservoir management. For example, operations of the method 200 of FIG. 2, as described above, may be implemented using the computing system 300. Computing system 300 can be a computer, phone, personal digital assistant ("PDA"), or any other type of electronic device. Such an electronic device includes various types of computer readable media and interfaces for various other types of computer readable media. As shown in FIG. 3, computing system 300 includes a permanent storage device 302, a system memory 304, an output device interface 306, a system communications bus 308, a read-only memory ("ROM") 310, processing unit(s) 312, an input device interface 314, and a network interface 316.

Bus 308 collectively represents all system, peripheral, and chipset buses that communicatively connect the numerous internal devices of the computing system 300. For instance, bus 308 communicatively connects the processing unit(s) 312 with the ROM 310, system memory 304, and permanent storage device 302. From these various memory units, processing unit(s) 312 retrieves instructions to execute and data to process in order to execute the processes of the subject disclosure. The processing unit(s) can be a single processor or a multi-core processor in different implementations.

ROM 310 stores static data and instructions that are needed by the processing unit(s) 312 and other modules of the computing system 300. Permanent storage device 302, on the other hand, is a read-and-write memory device. This device is a non-volatile memory unit that stores instructions and data even when the computing system 300 is off. Some implementations of the subject disclosure use a mass-storage device (such as a magnetic or optical disk and its corresponding disk drive) as the permanent storage device 902.

Other implementations use a removable storage device (such as a floppy disk, flash drive, and its corresponding disk drive) as the permanent storage device 302. Like the permanent storage device 302, system memory 304 is a read-and-write memory device. However, unlike storage device 302, system memory 304 is a volatile read-and-write memory, such a random access memory. System memory 304 stores some of the instructions and data that the processor needs at runtime. In some implementations, the processes of the subject disclosure are stored in system memory 304, permanent storage device 302, and/or ROM 310. For example, the various memory units include instructions for gravimetric analysis in reservoir management, in accordance with some implementations. From these various memory units, processing unit(s) 312 retrieves instructions to execute and data to process in order to execute the processes of some implementations.

Bus 308 also connects to the input and output device interfaces 314 and 306. Input device interface 314 enables the user to communicate information and select commands to computing system 300. Input devices used with the input device interface 314 include, for example, alphanumeric, QWERTY, or T9 keyboards, microphones, and pointing devices (also called "cursor control devices"). Output device interfaces 306 enables, for example, the display of images generated by the computing system 300. Output devices used with the output device interface 306 include, for example, printers and display devices, such as cathode ray tubes ("CRT") or liquid crystal displays ("LCD"). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 3, bus 308 also couples the computing system 300 to a public or private network (not shown) or combination of networks through a network interface 316. Such a network may include, for example, a local area network ("LAN"), such as an Intranet, or a wide area network ("WAN"), such as the Internet. Any or all components of the computing system 300 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs ("CD-ROM"), recordable compact discs ("CD-R"), rewritable compact discs ("CD-RW"), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits ("ASICs") or field programmable gate arrays ("FPGAs"). In some implementations, such integrated circuits execute instructions that are stored on the circuit itself. Accordingly, operations of the method 200 of FIG. 2, as described above, may be implemented using computing system 300 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs implemented on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of operations in the processes disclosed is an illustration of exemplary approaches. Based upon design preferences, it is understood that the specific order or hierarchy of operations in the processes may be rearranged, or that all illustrated operations be performed. Some of the operations may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Accordingly, the illustrative methods described herein integrate gravimetric data with dynamic reservoir simulations, and may be implemented in a variety of ways. For example, the inversion may be performed jointly with a dynamic flow simulation of the reservoir. Alternatively, the inversion may be performed as a joint history matching of production and gravimetric data. Moreover, the inversion may either be deterministic or stochastic. Here, deterministic means a gradient-based optimization algorithm such as Gauss-Newton or conjugate gradient methods; and stochastic means a gradient-free optimization algorithm such as genetic algorithms, simulated annealing, Markov Chain Monte Carlo (MCMC) or ensemble Kalman filtering (EnKF) methods. Therefore, the present disclosure has direct relevance for the characterization and monitoring of oil, gas, carbon dioxide, and/or water production and/or injection, including steam and chemically altered water (e.g., with polymers). The disclosure can also be implemented in onshore or offshore reservoirs provided sufficient density contrast exists during fluid substitution.

In yet other embodiments of the present disclosure, the methods described herein may be packaged as part of an integrated earth modeling software suite (e.g., Landmark Graphic Corp.'s DecisionSpace®). Also, the saturation models derived using the methods described herein may be used to plan, drill, or otherwise perform any number of wellbore operations (e.g., forecast reservoir production, and/or for controlling intelligent completions).

Embodiments and methods of the present disclosure described herein further relate to any one or more of the following paragraphs:

1. A method for reservoir management, the method comprising obtaining time-lapse gravimetric data of a reservoir; using an a priori saturation model, generating a time-lapse saturation model which is constrained by the time-lapse gravimetric data; using the a priori and time-lapse saturation models to generate an updated saturation model; and performing a dynamic reservoir simulation using the updated saturation model.

2. The method as defined in paragraph 1, wherein generating the time-lapse saturation model comprises applying reservoir-specific rules to at least one of the a priori and time-lapse saturation models.

3. The method as defined in paragraphs 1 or 2, wherein applying the reservoir-specific rules comprises applying an inversion to generate the time-lapse saturation model that enforces a sum of changes in water, gas, and oil saturations is equal to zero.

4. The method as defined in any of paragraphs 1-3, wherein applying the reservoir-specific rules comprises applying an inversion to generate the time-lapse saturation model that preserves a mass balance of fluid substitutions within the time-lapse saturation model.

5. The method as defined in any of paragraphs 1-4, wherein applying the reservoir-specific rules comprises applying an inversion rule to generate the time-lapse saturation model that assumes continuous fluid flow in the reservoir.

6. The method as defined in any of paragraphs 1-5, further comprising forecasting, planning, drilling or completing a wellbore based upon the dynamic reservoir simulation; using the updated saturation model to predict well production; or using the updated saturation model to match the dynamic reservoir simulation to historic production of at least one of the wellbore and multiple wellbores producing from the reservoir.

7. The method as defined in any of paragraphs 1-6, wherein the time-lapse gravimetric data consists of at least one component of at least one of a gravitational vector and gravitational gradients acquired using at least one of temporal and permanent sensors, wherein the sensors may be deployed from a surface or from a borehole.

8. A system for reservoir management, comprising one or more downhole sensors to obtain gravimetric data; and one or more hardware processors coupled to the sensors and operable to cause the system to perform operations comprising obtaining time-lapse gravimetric data of a reservoir using the sensors; using an a priori saturation model, generating a time-lapse saturation model which is constrained by the time-lapse gravimetric data; using the a priori and time-lapse saturation models to generate an updated saturation model; and performing a dynamic reservoir simulation using the updated saturation model.

9. The system as defined in paragraph 8, wherein generating the time-lapse saturation model comprises applying reservoir-specific rules to at least one of the a priori and time-lapse saturation models.

10. The system as defined in paragraphs 8 or 9, wherein applying the reservoir-specific rules comprises applying an inversion to generate the time-lapse saturation model that enforces a sum of changes in water, gas, and oil saturations is equal to zero.

11. The system as defined in any of paragraphs 8-10, wherein applying the reservoir-specific rules comprises applying an inversion to generate the time-lapse saturation model that preserves a mass balance of fluid substitutions within the time-lapse saturation model.

12. The system as defined in any of paragraphs 8-11, wherein applying the reservoir-specific rules comprises applying an inversion rule to generate the time-lapse saturation model that assumes continuous fluid flow in the reservoir.

13. The system as defined in any of paragraphs 8-12, further comprising forecasting, planning, drilling or completing a wellbore; using the updated saturation model to predict well production; or using the updated saturation model to match the dynamic reservoir simulation to historic production of the wellbore and/or multiple wellbores producing from the reservoir.

14. The system as defined in any of paragraphs 8-13, wherein the time-lapse gravimetric data consists of at least one component of at least one of a gravitational vector and gravitational gradients acquired using at least one of temporal and permanent sensors, wherein the sensors may be deployed from a surface or from a borehole.

Furthermore, the illustrative methods described herein may be implemented by a system comprising processing circuitry or a non-transitory computer readable medium comprising instructions which, when read from the medium and executed by at least one hardware processor, causes the processor to perform any of the methods described herein.

Although various embodiments and methods have been shown and described, the present disclosure is not limited to such embodiments and methods and will be understood to include all modifications and variations as would be apparent to one skilled in the art. Therefore, it should be understood that this disclosure is not intended to be limited to the particular forms disclosed. Rather, the intention is to cover all modifications, equivalents and alternatives falling within the spirit and scope of the disclosure as defined by the appended claims.

What is claimed is:

1. A method for reservoir management, the method comprising:
    obtaining time-lapse gravimetric data of a reservoir;
    using an a priori saturation model, generating a time-lapse saturation model which is constrained by the time-lapse gravimetric data;
    using the a priori and time-lapse saturation models to generate an updated saturation model;
    performing a dynamic reservoir simulation using the updated saturation model,
    wherein generating the time-lapse saturation model comprises applying reservoir-specific rules to at least one of the a priori and time-lapse saturation models, the reservoir-specific rules comprising at least one of:
        applying an inversion to generate the time-lapse saturation model that enforces a sum of changes in water, gas, and oil saturations is equal to zero;
        applying an inversion to generate the time-lapse saturation model that preserves a mass balance of fluid substitutions within the time-lapse saturation model; or
        applying an inversion rule to generate the time-lapse saturation model that assumes continuous fluid flow in the reservoir; and
    using the dynamic reservoir simulation to perform a wellbore operation.

2. The method as defined in claim 1, further comprising:
    forecasting, planning, drilling or completing a wellbore based upon the dynamic reservoir simulation;
    using the updated saturation model to predict well production; or
    using the updated saturation model to match the dynamic reservoir simulation to historic production of at least one of the wellbore and multiple wellbores producing from the reservoir.

3. The method as defined in claim 1, wherein the time-lapse gravimetric data consists of at least one component of at least one of a gravitational vector and gravitational gradients acquired using at least one of temporal and permanent sensors, wherein the sensors may be deployed from a surface or from a borehole.

4. A system for reservoir management, comprising:
    one or more downhole sensors to obtain gravimetric data; and
    one or more hardware processors coupled to the sensors and operable to cause the system to perform operations comprising:
        obtaining time-lapse gravimetric data of a reservoir using the sensors;
        using an a priori saturation model, generating a time-lapse saturation model which is constrained by the time-lapse gravimetric data;
        using the a priori and time-lapse saturation models to generate an updated saturation model;
        performing a dynamic reservoir simulation using the updated saturation model,
        wherein generating the time-lapse saturation model comprises applying reservoir-specific rules to at least one of the a priori and time-lapse saturation models, the reservoir-specific rules comprising at least one of:
            applying an inversion to generate the time-lapse saturation model that enforces a sum of changes in water, gas, and oil saturations is equal to zero;
            applying an inversion to generate the time-lapse saturation model that preserves a mass balance of fluid substitutions within the time-lapse saturation model; or
            applying an inversion rule to generate the time-lapse saturation model that assumes continuous fluid flow in the reservoir; and
        using the dynamic reservoir simulation to perform a wellbore operation.

5. The system as defined in claim 4, further comprising:
forecasting, planning, drilling or completing a wellbore;
using the updated saturation model to predict well production; or
using the updated saturation model to match the dynamic reservoir simulation to historic production of the wellbore and/or multiple wellbores producing from the reservoir.

6. The system as defined in claim 4, wherein the time-lapse gravimetric data consists of at least one component of at least one of a gravitational vector and gravitational gradients acquired using at least one of temporal and permanent sensors, wherein the sensors may be deployed from a surface or from a borehole.

7. A non-transitory computer-readable medium comprising instructions which, when executed by a processor, causes the processor to perform a method comprising:
obtaining time-lapse gravimetric data of a reservoir;
using an a priori saturation model, generating a time-lapse saturation model which is constrained by the time-lapse gravimetric data;
using the a priori and time-lapse saturation models to generate an updated saturation model; and
performing a dynamic reservoir simulation using the updated saturation model,
wherein generating the time-lapse saturation model comprises applying reservoir-specific rules to at least one of the a priori and time-lapse saturation models, the reservoir-specific rules comprising at least one of:
applying an inversion to generate the time-lapse saturation model that enforces a sum of changes in water, gas, and oil saturations is equal to zero;
applying an inversion to generate the time-lapse saturation model that preserves a mass balance of fluid substitutions within the time-lapse saturation model; or
applying an inversion rule to generate the time-lapse saturation model that assumes continuous fluid flow in the reservoir; and
using the dynamic reservoir simulation to perform a wellbore operation.

8. The computer-readable medium as defined in claim 7, further comprising:
forecasting, planning, drilling or completing a wellbore based upon the dynamic reservoir simulation;
using the updated saturation model to predict well production; or
using the updated saturation model to match the dynamic reservoir simulation to historic production of at least one of the wellbore and multiple wellbores producing from the reservoir.

\* \* \* \* \*